United States Patent
Keshet

(10) Patent No.: US 7,742,660 B2
(45) Date of Patent: Jun. 22, 2010

(54) SCALE-SPACE SELF-SIMILARITY IMAGE PROCESSING

(75) Inventor: Renato Keshet, Hod Hasharon (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 829 days.

(21) Appl. No.: 11/096,651

(22) Filed: Mar. 31, 2005

(65) Prior Publication Data

US 2006/0222265 A1 Oct. 5, 2006

(51) Int. Cl.
*G06K 9/32* (2006.01)
*G06K 9/40* (2006.01)

(52) U.S. Cl. ...................... 382/298; 382/254

(58) Field of Classification Search ................ 382/254, 382/279, 298, 299
See application file for complete search history.

(56) References Cited

U.S. PATENT DOCUMENTS

| | | | | |
|---|---|---|---|---|
| 5,526,446 A | * | 6/1996 | Adelson et al. | 382/275 |
| 5,604,824 A | * | 2/1997 | Chui et al. | 382/248 |
| 6,249,617 B1 | * | 6/2001 | Chen | 382/298 |
| 6,681,059 B1 | * | 1/2004 | Thompson | 382/298 |
| 6,891,968 B2 | * | 5/2005 | Janardhanan | 382/162 |
| 7,116,841 B2 | * | 10/2006 | Wright | 382/298 |
| 7,200,278 B2 | * | 4/2007 | Long et al. | 382/266 |
| 2003/0016884 A1 | * | 1/2003 | Altunbasak et al. | 382/299 |
| 2003/0156764 A1 | * | 8/2003 | Russo | 382/298 |
| 2004/0096103 A1 | * | 5/2004 | Gallagher et al. | 382/167 |
| 2005/0232514 A1 | * | 10/2005 | Chen | 382/298 |
| 2006/0008171 A1 | * | 1/2006 | Petschnigg et al. | 382/254 |

OTHER PUBLICATIONS

Schultz et al. "Subpixel Motion Estimation for Super-Resolution Image Sequence Enhancement", Mar. 1998, Journal of Visual Communication and Image Representation,, vol. 9, No. 1, pp. 38-50.*

* cited by examiner

*Primary Examiner*—Bhavesh M Mehta
*Assistant Examiner*—Stephen R Koziol

(57) ABSTRACT

Image processing includes computing image $f_t$ from image $f_s$, where images $f_t$ and $f_s$ are representations of a self-similar image at scales t and s in a scale-space, where t<s. Such processing may adapted for image deblurring, denoising and upscaling.

44 Claims, 6 Drawing Sheets

SCALE-SPACE SELF-SIMILARITY IMAGE PROCESSING

BACKGROUND

Image processing is performed in imaging products such as printers, scanners, digital cameras, and projectors. The image processing, which typically includes deblurring, denoising and upscaling, is intended to improve image quality.

Deblurring may be performed by a technique such as unsharp masking, soft toggling, or operator inversion. However, these techniques are not stable in sharp or noisy regions, and can produce jaggedness on some edges.

Denoising may be performed by a technique such as bilateral filtering, which reduces noise while preserving edges. However, bilateral filtering can leave noise and create artifacts close to edges.

Upscaling may be performed by a technique such as bilinear or cubic interpolation. These techniques tend to produce images with blurry edges and images that aren't as sharp as they could be.

Image processing that produces sharper edges, less noise and fewer artifacts is desirable.

SUMMARY

According to one aspect of the present invention, image processing includes computing image $f_t$ from image $f_s$, where images $f_t$ and $f_s$ are representations of a self-similar image at scales t and s in a scale-space, where t<s.

According to other aspects of the present invention, the image processing can be adapted for image deblurring, upscaling and denoising.

Still other aspects and advantages of the present invention will become apparent from the following detailed description, taken in conjunction with the accompanying drawings, illustrating by way of example the principles of the present invention.

BRIEF DESCRIPTION OF THE DRAWINGS

FIG. 1b is an illustration of an image that is not self-similar.

DETAILED DESCRIPTION

Figure 1A:
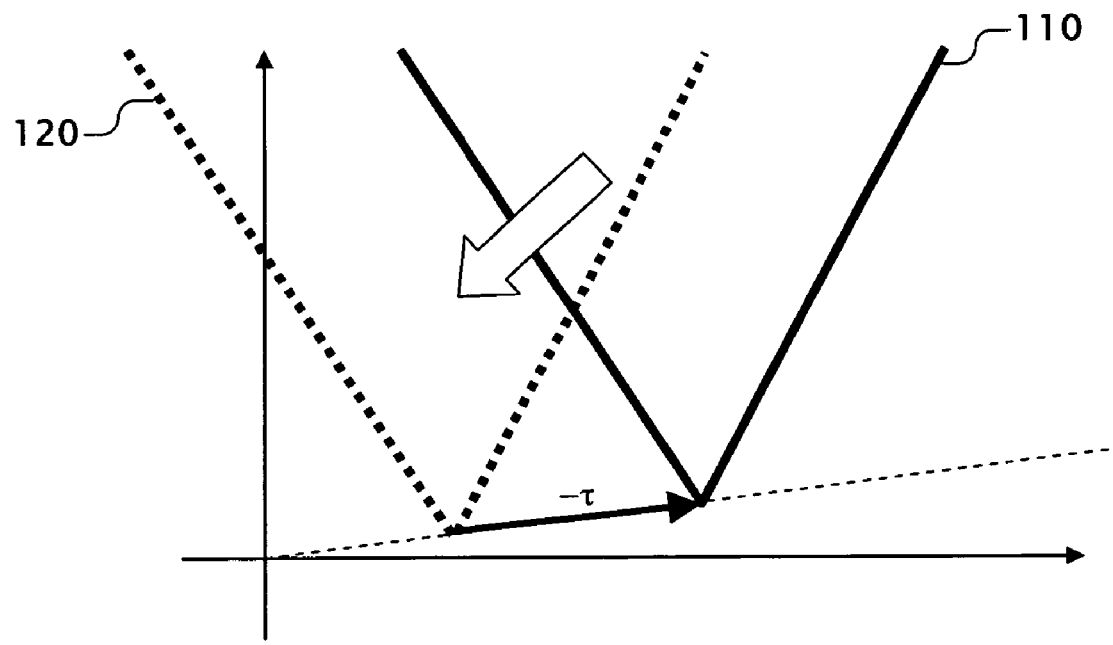
FIG. 1a is an illustration of a self-similar image.

As shown in the drawings for the purpose of illustration, the present invention is embodied in image processing that combines self-similarity and scale-space. The image processing includes computing image $f_t$ from image $f_s$, where images $f_t$ and $f_s$ are representations of a self-similar image at scales t and s in a scale-space, where t<s. The image processing can be adapted for image deblurring, upscaling and denoising.

Scale-Space

Consider the d-dimensional Euclidean space $IR^d$. A scale-space is a family of operators $\{T(s)\}$, where each operator T(s) maps a given continuous function f: $IR^d \rightarrow IR$ to a representation T(s)f of the given function at a certain scale s. The representation at scale s=0 is identical to the given function, that is, T(0)f=f. The function loses information as the scale s increases. In a scale-space, it is usually straightforward to go from a smaller scale to a larger scale (natural flow). That is, it is usually straightforward to find a representation at a larger scale from a representation at a smaller scale.

A scale-space is characterized by how information is removed from one scale to another. Different scale-spaces may have different mathematical properties.

A scale-space is "additive" if the representation at a scale s+t is identical to the representation at scale s of the representation of the given image at scale t. That is, scale-space T is additive if for all t,s>0:

$$T(s+t)=T(s)T(t).$$

If the scale-space is linear, then for each t, the operation T(t)f can be written as a convolution T(t)f=f*$h_t$, where $\{h_t\}$ is a family of kernels.

One particular case of a linear additive scale-space is the well-known Gaussian scale-space. The well-known Gaussian scale-space in 1-D is $$[T(t)f](x) = (4\pi a t)^{-1/2} \int_{-\infty}^{\infty} f(x-y)\exp\left(-\frac{y^2}{4at}\right) dy,$$

where a is a user-defined constant. The 1-D Gaussian scale-space can be expressed by a collection of convolutions by Gaussian kernels of different variances:

$$h_t(x) \triangleq (4\pi a t)^{-1/2} \exp\left(-\frac{x^2}{4at}\right).$$

Self-Similarity

A continuous function f: $IR^d \rightarrow IR$ is self-similar if it is identical to a downscaled and translated version of itself. That is, the function f is self-similar if there exist r>1 and τ such that $$f(x)=f[r(x+\tau)] \qquad (1)$$

where r is a scaling factor and τ is a displacement or translation vector.

FIG. 1a provides a simple illustration of a self-similar function: a wedge 110. The wedge 110 is (globally) self-similar because the translation vector (−τ) can be found such that the translated downscaled wedge 120 is identical to the original wedge 110.

Figure 1B:
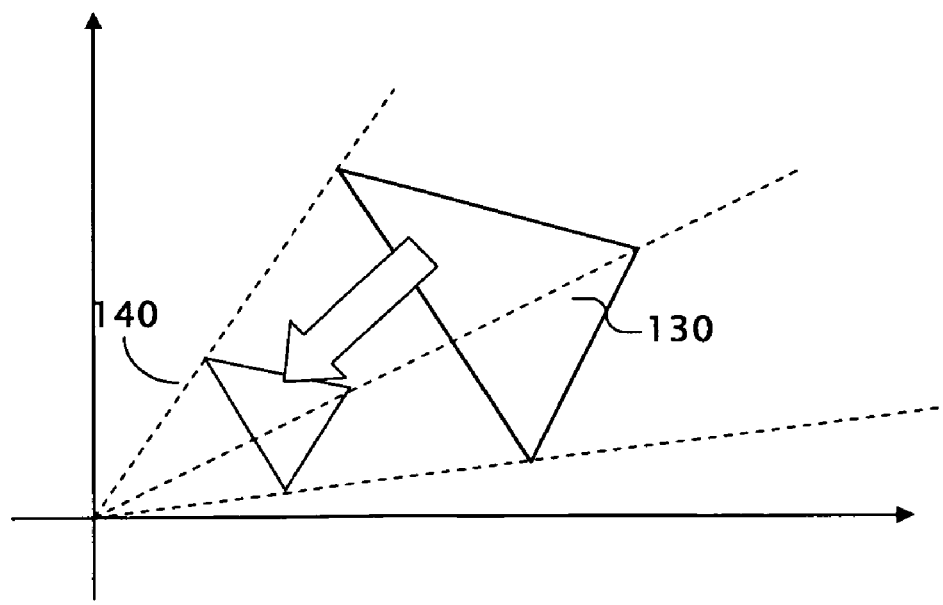

FIG. 1b provides a simple illustration of a function that is not self-similar: a triangle 130. The triangle 130 is not (globally) self-similar because after being downscaled, it cannot be recovered by simple translation. That is, the downscaled triangle 140 is not only at a different position from the original; it has a different shape (i.e., a different size).

Basic Mathematical Relationship

The image processing according to the present invention uses the following basic mathematical relationship. If an image $f:\mathbb{IR}^d \to \mathbb{IR}$ is self-similar, then, for all t greater or equal to $s/r^2$, image $f_t$ can be computed from $f_s$ according to the following equation:

$$f_t(x) = (f_s * h_{tr^2-s})[r(x+\tau)].$$

Consider the following two particular cases of interest. In the first case, $t=s/r^2$, whereby the basic mathematical relationship becomes $$f_{s/r^2}(x) = f_s[r(x+\tau)].$$

In the second case, $t=s$, whereby the basic mathematical relationship becomes $$f_s(x) = (f_s * h_{s(r^2-1)}))[r(x+\tau)].$$

The second case provides a way for performing parameter estimation.

Image processing according to the present invention is not limited to images that are continuous. The image processing may also be performed on discrete images, and, in particular, discretized (digitized) versions of continuous images. Thus, $f_s$ and $f_t$ may also denote representations of discrete versions of self-similar images. A discrete image is a function mapping the d-dimensional integer grid $\mathbb{Z}^d$ into the set of integers $\mathbb{Z}$. Processing of discrete images in accordance with the present invention involves discretized versions of the above basic mathematical relationship and its derivations. In the discretized versions of the above equations, the parameter x will belong to the integer grid of points in the d-dimensional Euclidean space, the kernels $h_s$ will be discrete approximations of the corresponding continuous Gaussian kernels, and the convolution operator * will correspond to discrete convolution.

A discrete image such as a discretized version of a continuous image may be acquired by an image capture device such as a scanner or a digital camera. However, a discrete image could also be an image that was originally created digitally on a computer, without being digitized from any continuous image. Examples include images created by graphic artists, CAD systems, etc.

General Processing of Representations of Self-Similar Images in a Scale-Space

In some embodiments of the present invention, the dimension d of the Euclidean space is equal to 2, which means that the continuous or discrete image f, and all its scale-space representations, are bi-dimensional images. Other embodiments relate to other dimensions, such as when d=3, which leads to tri-dimensional images.

Figure 2:
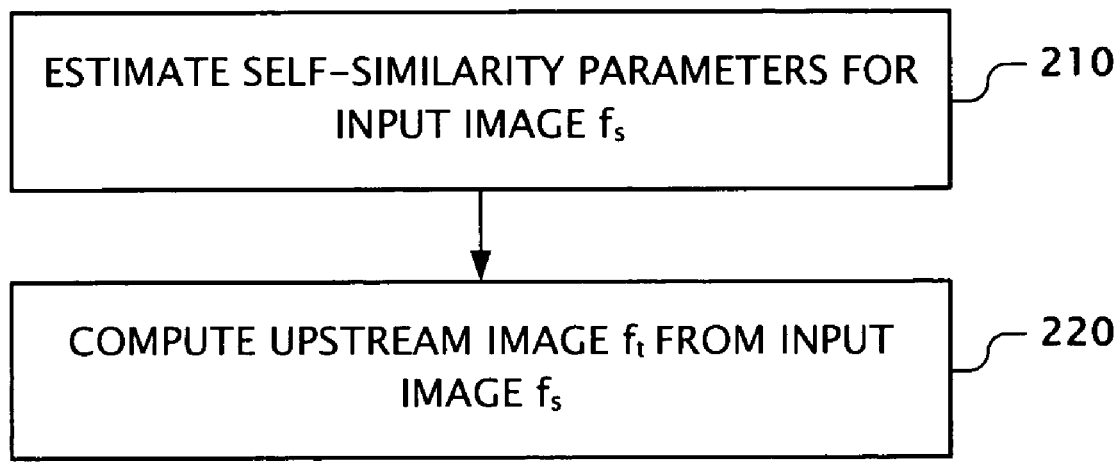
FIG. 2 is an illustration of a method of processing an image in accordance with an embodiment of the present invention.

Reference is made to FIG. 2, which illustrates a general method of performing scale-space self-similarity image processing on an input image. The input image $f_s$ is considered a scale-space representation (at scale s) of a self-similar image $f = f_0$ (the image f is self-similar at scale s=0). The goal of the processing is to compute an image $f_t$ that is upstream the input image $f_s$ and thereby closer (in scale-space) to the self-similar image $f_0$. Images $f_s$ and $f_t$ can be continuous functions, or they can be discrete versions of continuous functions, in which case discrete image processing and discrete versions of the basic mathematical relationship and its derivations are used.

Self-similarity parameters for the input image $f_s$ are estimated (block 210). For example, the self-similarity parameters may include the translation vector $\tau$, the input scale s, and the scaling ratio r. In some embodiments, the scaling ratio r may be fixed a priori, whereby only the translation vector $\tau$ and the input scale s are estimated. The self-similarity parameters $\tau$, s, and r apply to the basic relationship mentioned above. However, these self-similarity parameters may be adapted for specific situations or scale-spaces. In case of local self-similarity, which will be described below, locally dependent parameters $\tau(y)$ and $s(y)$, for each position y, may be used instead of $\tau$ and s. Each position (y) may correspond to a single point or pixel, or each position (y) may correspond to a group of points or pixels. As another example, cross-scale motion v(y) may be estimated instead of $\tau(y)$.

The self-similarity parameters are used to move upstream in scale-space (block 220). Thus, image $f_t$ is computed from image $f_s$, where t<s. Thus, the processing according to the present invention opposes the natural flow by computing a representation at a smaller scale from a representation at a larger scale (upstream flow or flow inversion).

For example, with reference to the basic mathematical relationship, the entire image is further blurred by the scale-space kernel with index $tr^2-s$, then scaled by the ratio r, and finally translated by $-\tau$. Other variants are possible, depending upon the properties of the scale-space and the image processing goals (e.g., upscaling, deblurring, denoising). A typical situation occurs when $t=s/r^2$, in which the further blurring step does not need to be applied, because the corresponding kernel is $h_0$, which is the identity operator.

The input image $f_s$ may be generated by an image capture device (e.g., digital camera, scanner). The process of image capture by most image capture devices can be modeled as a representation of the "original scene". However, an image capture device is not the only way to generate the input image $f_s$. For example, digital operators or processes can be used to generate the input image $f_s$. For instance, $f_s$ can be generated by blurring a given image by a Gaussian kernel.

Locally Self-Similar Images and the Gaussian Scale-Space

Consider the example of Gaussian scale-space. If an original image is blurred by a Gaussian kernel, the blurred image is a representation of the original image at some scale of the Gaussian scale-space. Thus, the input image $f_s$ can be modeled as a representation of the "original scene" at some scale of the scale-space, because the input image is a blurred version of the original scene, and this blur can be approximated by a Gaussian blur.

In 2-D Gaussian scale-space, $T(t)f = f * h_t$, where $$h_t(x) \triangleq \frac{1}{\sqrt{4\pi at}} \exp\left(-\frac{\|x\|^2}{4at}\right),$$

and where a is a user-defined parameter.

Consider a window W centered at the origin of the Euclidean space $\mathbb{IR}^d$, and let y+z represent a position in an input image f, where $z \in W$. By replacing x by y+z in the self-similarity identity equation (1), the following equation is obtained:

$$f(y+z) = f[r(y+z+\tau)] = f[y+v(y)+rz]$$

where $v(y) = (r-1)y + r\tau$. According to this equation, an image f is self-similar, if for each position y, the data within the window W centered on y is identical (up to scaling by r) to the data within a window r times larger, centered at the position y+v(y). The function v(y) is called cross-scale motion.

Figure 3:
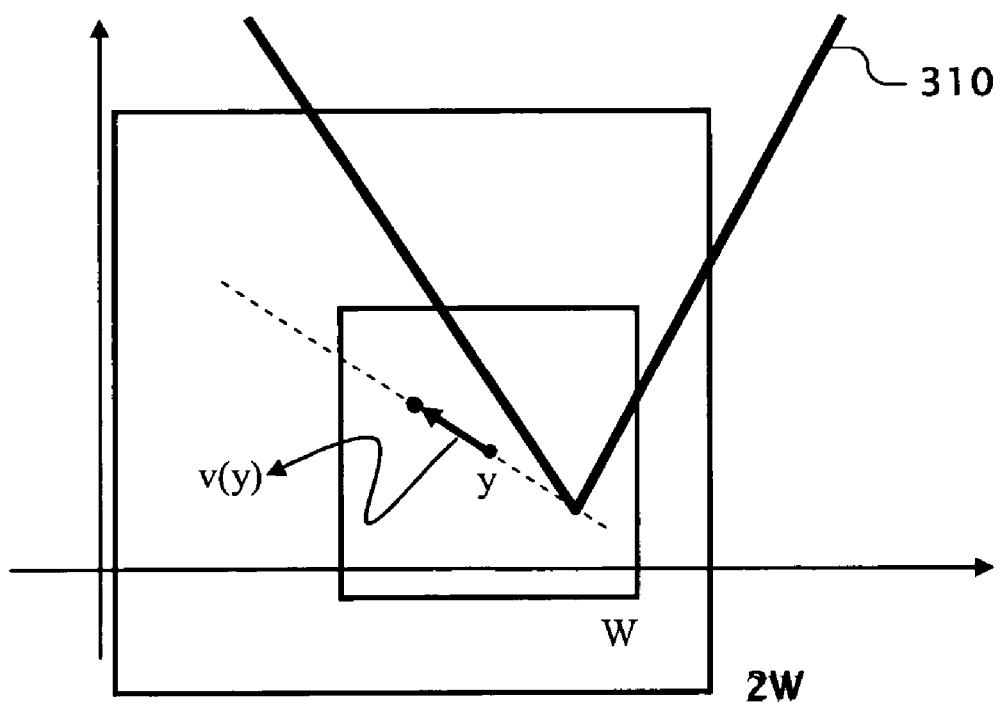
FIG. 3 is an illustration of cross-scale motion with respect to a locally self-similar image in Gaussian scale-space.

Reference is now made to FIG. 3, which illustrates the cross-scale motion v(y) for a self-similar image. A wedge 310 is self-similar because for any position y, there exists a vector v(y), such that the image inside a window W centered at position y is identical (up to scaling) to the image within the window 2W (twice as big as window W), centered on y+v(y). An advantage of using cross-scale motion v(y) instead of τ(y) is that the values of the cross-scale motion are usually bounded, and thus simpler to estimate.

This self-similarity is global because the window W can be of any size, including infinite size. If, however, this self-similarity property holds only when the size of the window W is smaller than a finite constant, then image f is said to be "locally" self-similar. Accordingly, the triangle 130 in FIG. 1b is locally self-similar. When local self-similarity holds, the basic relationship becomes:

$$f_t(y+z) = (f_s * h_{tr^2 - s})[y + v(y) + rz],$$

and, in particular, when $t = s/r^2$, $$f_{s/r^2}(y+z) = f_s[y + v(y) + rz]. \quad (2)$$

Figure 4:
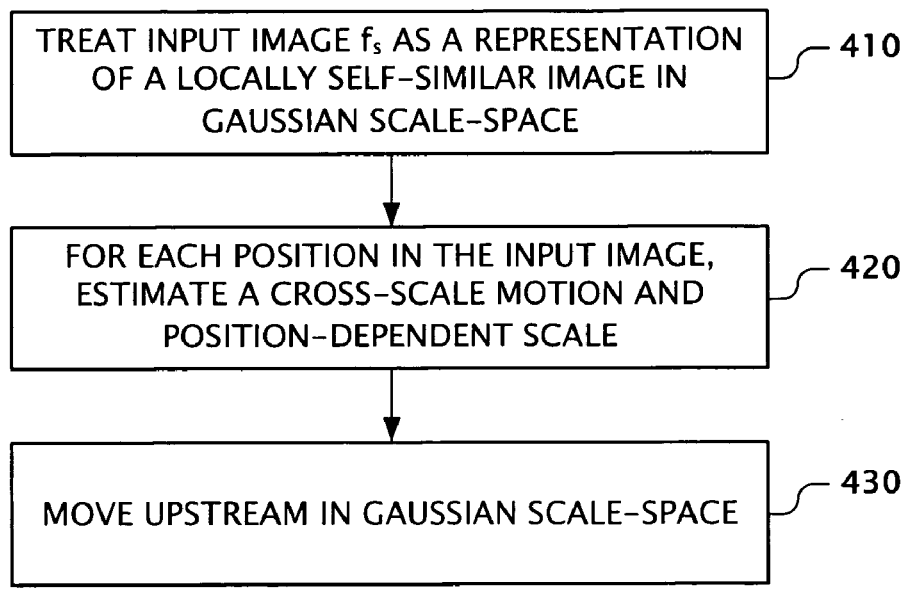
FIG. 4 is an illustration of a method of processing an image in accordance with an embodiment of the present invention, the processing performed with respect to Gaussian scale-space.

Processing Representations of Locally Self-Similar Images in Gaussian Scale-Space Reference is now made to FIG. 4, which illustrates a method of processing a representation of a locally self-similar image in Gaussian scale-space. At block 410, an image f is received. The input image f is treated as a representation $f_s$ of a locally self-similar image f in Gaussian scale-space. In some embodiments, the input image will be discrete.

At block 420, a cross-scale motion v(y) and position-dependent scale s(y) are estimated for each position y in the support of the input image $f_s$. The cross-scale motion v(y) and scaling s(y) for each position (y) can be estimated by minimizing the following equation:

$$\varepsilon(v(y), s(y)) \triangleq \sum_{z \in W} |f_s(z+y) - (f_s * h_{s(y)(r-1)})(y + v(y) + rz)|^2.$$

In some situations (discussed below), there is no need to estimate the position-dependent scale s(y). For these situations, an approximate but faster estimation of the cross-scale motion v(y) only can be found by minimizing the following.

$$\varepsilon(v(y)) \triangleq \sum_{z \in W} |f_s(z+y) - f_s(y + v(y) + rz)|^2.$$

To solve for v(y) and s(y), or v(y) only, block matching techniques can be used, except that two blocks to be matched are at different sampling rates (instead of being to different images). Motion estimation and optical flow are among the block matching techniques that can be adapted.

For example, the block motion estimation may be performed as follows.

1. Let $$q(m) \triangleq \sum_{z \in W} |f_s(z+y) - f_s(rz + y + m)|^2,$$

where q(m) is a matching similarity value for a displacement m in $\mathbb{Z}^d$.

2. Compute q(m) at a finite number of points within (r−1)W, which is the window W scaled r−1 times. For example, if W is a 3×3 window, and r=2, then q(m) could be computed at {(a,b)}, where a and b belong to {−1, 0, 1}.

3. Let $\tilde{q}(m) = \phi[q(m)]$, where $\phi(x)$ is a function that enhances the differences within q(m). For example, $\phi(x) = 1/(x - M + 1)$, where $M = \min\{q(a,b)\}$.

4. Set v(y) to the first moment of the discrete data $\{\tilde{q}(m)\}_m$. Specifically, $$v(y) = \sum_{m \in (r-1)W} m \cdot \tilde{q}(m) \Big/ \sum_{m \in (r-1)W} \tilde{q}(m).$$

In the alternative, another method such as polynomial fitting of the data $\{\tilde{q}(m)\}_m$ may be used to determine the values for v(y). In other embodiments, v(y) may be set to the value of m for which $\tilde{q}(m)$ is minimal.

At block 430, upstream flow is computed. The upstream flow may be computed as $f_t(y+z) = (f_s * h_{tr^2 - s})[y + v(y) + rz]$. In particular, when $t = s/r^2$, the upstream flow may be computed as $f_{s/r^2}(y+z) = f_s[y + v(y) + rz], \forall z \in W$.

The following techniques may be used to compute the upstream flow: disjoint block computation, or overlapping block computation, or scalar computation. These techniques involve mapping an rN×rN block of $f_s * h_{tr^2 - s(y)}$ centered at y+v(y) to the N×N block of $f_t$ centered at y. When $t = s/r^2$, these techniques involve mapping an rN×rN block of $f_s$ centered at y+v(y) to the N×N block of $f_t$ centered at y.

Disjoint block computation: Assume that W is an N×N window centered on the origin, where N>1. A squared grid of points in $\mathbb{Z}^d$ is selected, where the distance between each two horizontal or vertical points is exactly N. Now, $f_{s/r^2}(y+z) = f_s[y + v(y) + rz], \forall z \in W$ is used for all point y in the grid, and $z \in (-N/2, N/2] \times (-N/2, N/2]$. In the disjoint block computation, the values of v(y) are calculated on a subset of points y in the grid (those points that belong to the N×N grid), instead of all points in the grid.

Overlapping block computation: Assume that W is an N×N window centered on the origin and N>1, but the grid of points has horizontal and vertical distances of M<N. A kernel K(x) satisfying $$\sum_{m \in \mathbb{Z}^2} K(x + mM) = 1,$$

for all x is designed. Since the blocks overlap, a weighted average is performed. The kernel K provides the appropriate weights. For instance, for M=N/2, the bilinear kernel $K(x) = \max(0, 1 - \|x\|_1)$ can be used, where $\|\cdot\|_1$ is the $L_1$ norm in $\mathbb{R}^2$. The kernel K(x) looks like a pyramid, with each base side of length 2. Assuming that y is on the grid, the upstream flow calculation can be modified to the following. For all z∈(−M/2,M/2]×(−M/2,M/2], $$f_{s/r^2}(y+z) = \sum_{m \in G} K(y-m)f_s[m+v(m)+rz].$$

The overlapping block computation provides an embedded filtering mechanism, and therefore is the most robust to noise.

Scalar computation: Assume that W is a trivial window of size 1×1, and therefore z is always equal to 0 in equation (2). This yields $f_{s/r^2}(y)=f_s[y+v(y)]$. Thus, each pixel is processed without involvement from neighboring pixels (in contrast to the block-based computations).

Overlapping block computation is more complex, robust and expensive than disjoint block computation, which is more complex, robust and expensive than scalar computation. The scalar computation provides the simplest and least expensive alternative, but also the least robust.

The scale-space self-similarity image processing can be adapted to achieve different processing objectives. The different objectives include, without limitation, denoising, deblurring or image upscaling.

Figure 5:
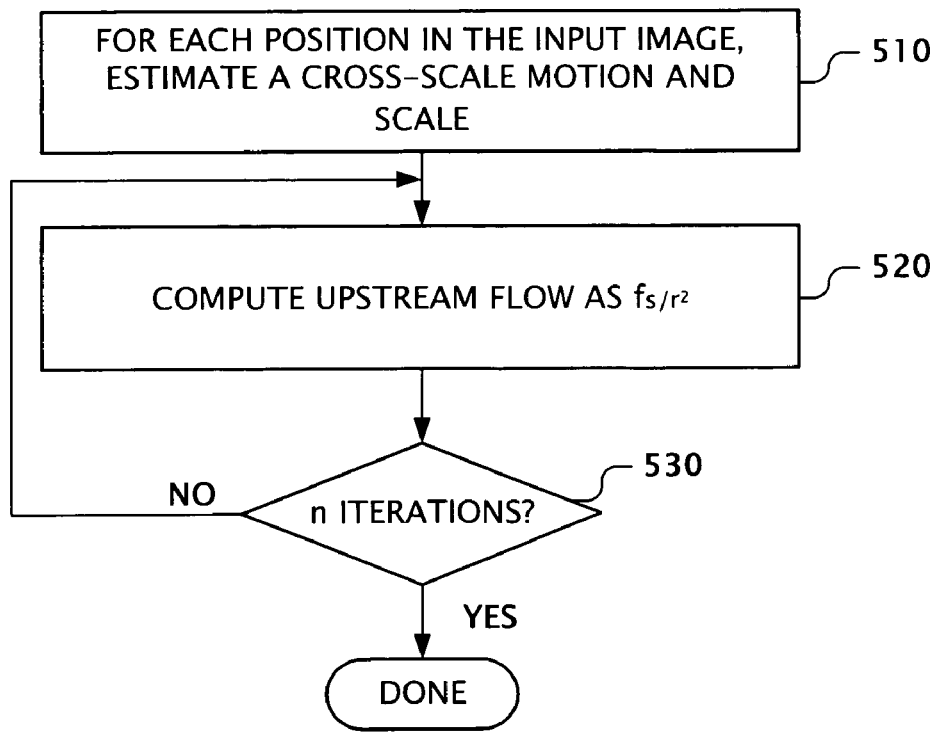
FIG. 5 is an illustration of a method of deblurring a digital image in accordance with an embodiment of the present invention.

Deblurring of Representations of Locally Self-Similar Images in Gaussian Scale-Space Reference is now made to FIG. 5, which illustrates a method of deblurring a locally self-similar image in Gaussian scale-space. The deblurring method includes estimating the cross-scale motion for every position (y) in the input image $f_s$ (block 510), and then computing the upstream flow as $f_{s/r^{2n}}$ (block 520) over n iterations to obtain an output image (block 530). Iterating a very large number of times would yield an approximation to the underlying locally self-similar image (that is, t=0). However, if the scale of the output image $f_t$ is t=0, the output image $f_t$ might appear unnatural and jaggy. Instead 0<t≤s, whereby the amount of blur is only reduced.

Figure 6:
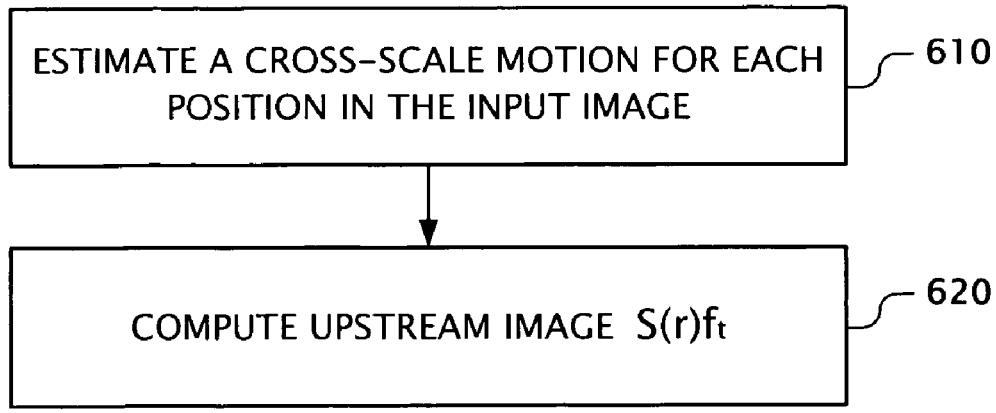
FIG. 6 is an illustration of a method of upscaling a digital image in accordance with an embodiment of the present invention.
Figure 7:
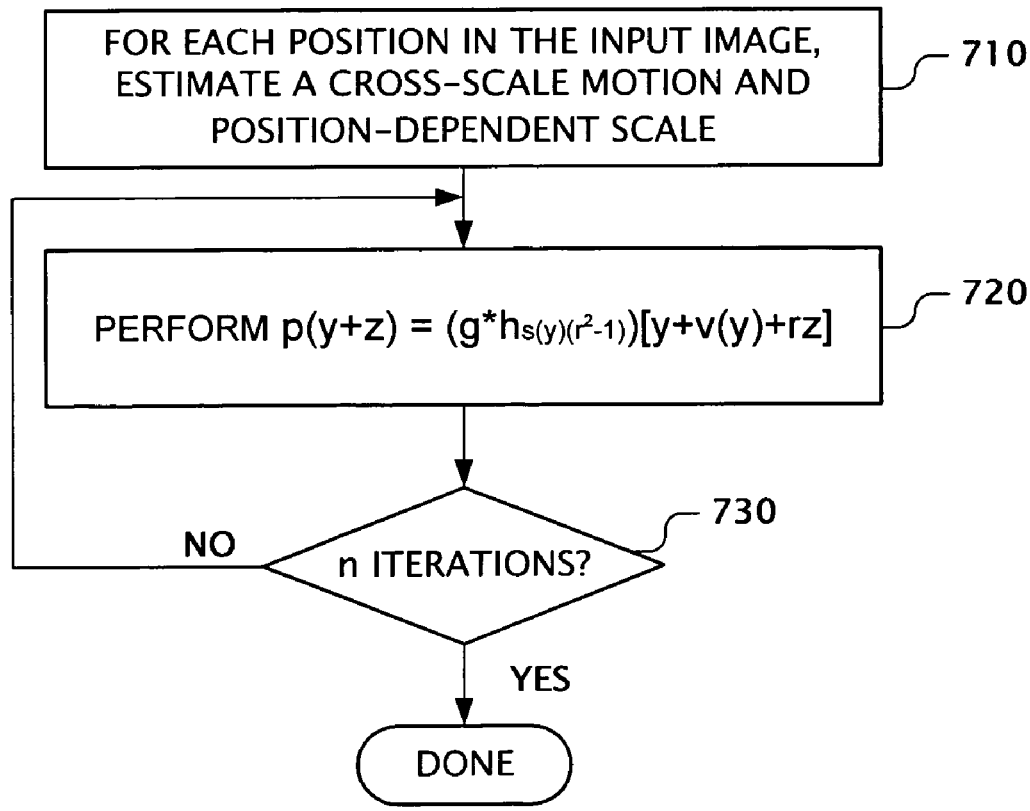
FIG. 7 is an illustration of a method of denoising a digital image in accordance with an embodiment of the present invention.

Upscaling of Representations of Locally Self-Similar Images in Gaussian Scale-Space Reference is now made to FIG. 6, which illustrates a method of upscaling a locally self-similar image in Gaussian scale-space. Operator S(r) refers to a continuous scaling operator with a factor r. The upscaling method includes estimating only the cross-scale motion for every position (y) in the input image $f_s$ (block 610), and then computing S(r)$f_t$ as S(r)$f_{s/r^2}$(ry+z)=$f_{s/r^2}$[(ry+z)/r]=$f_{s/r^2}$[y+z/r]=$f_s$[y+v(y)+z] (block 620). The cross-scale motion v(y) may be computed in the same way it is done for deblurring. Block 620 can be implemented by disjoint block, overlapping block, or scalar computation, similar to the way it is done for deblurring. More generally, the upscaling involves mapping an N×N block of the input image centered at position y+v(y) to an N×N block of the upscaled image centered at position ry Denoising of Representations of Locally Self-Similar Images in Gaussian Scale-Space Reference is now made to FIG. 7, which illustrates a method of denoising an image g(x). The image g(x) may be modeled with two components: a representation of a self-similar image at scale s in a scale-space; and a noise component. That is, g(x)=$f_s$(x)+n(x), where n(x) is the noise component. The denoising method includes estimating the cross-scale motion v(y) and position-dependent scale s(y) for each position y in the input image $f_s$ (block 710), and performing the operation p(y+z)=(g*$h_{s(y)(r^2-1)}$)[y+v(y)+rz] at each position y (block 720), where p is the filtered output image. More generally, an rN×rN block of the digital image $f_s$+n convolved by a scale-space kernel indexed s(y)($r^2-1$), centered at position y+v(y) is mapped to an N×N block of the image $f_t$ centered at position y. The convolution operation in the above operation results in noise reduction. Consequently, the overall operation removes energy from the noise n(x). However, the overall operation does not modify the component $f_s$(x). Block 720 can be implemented by disjoint block, overlapping block, or scalar computation, similar to the way it is done for deblurring.

Quality of the image $f_t$ may be improved by iterations of the operation. The operation may be repeated until the output image $f_t$ reaches a desired quality (block 730).

Processing of Natural Images

The method according to the present invention can also be applied to images that are not scale-space representations of self-similar images. Images that are not self-similar are those that no matter how small the window W is made, there will always be a sub-image fitting in that window that is not self-similar. Natural images contain many thin details that cannot be considered self-similar. Yet even though natural images are not scale-space representations of self-similar images, the method according to the present invention can be applied to natural images.

Figure 8:
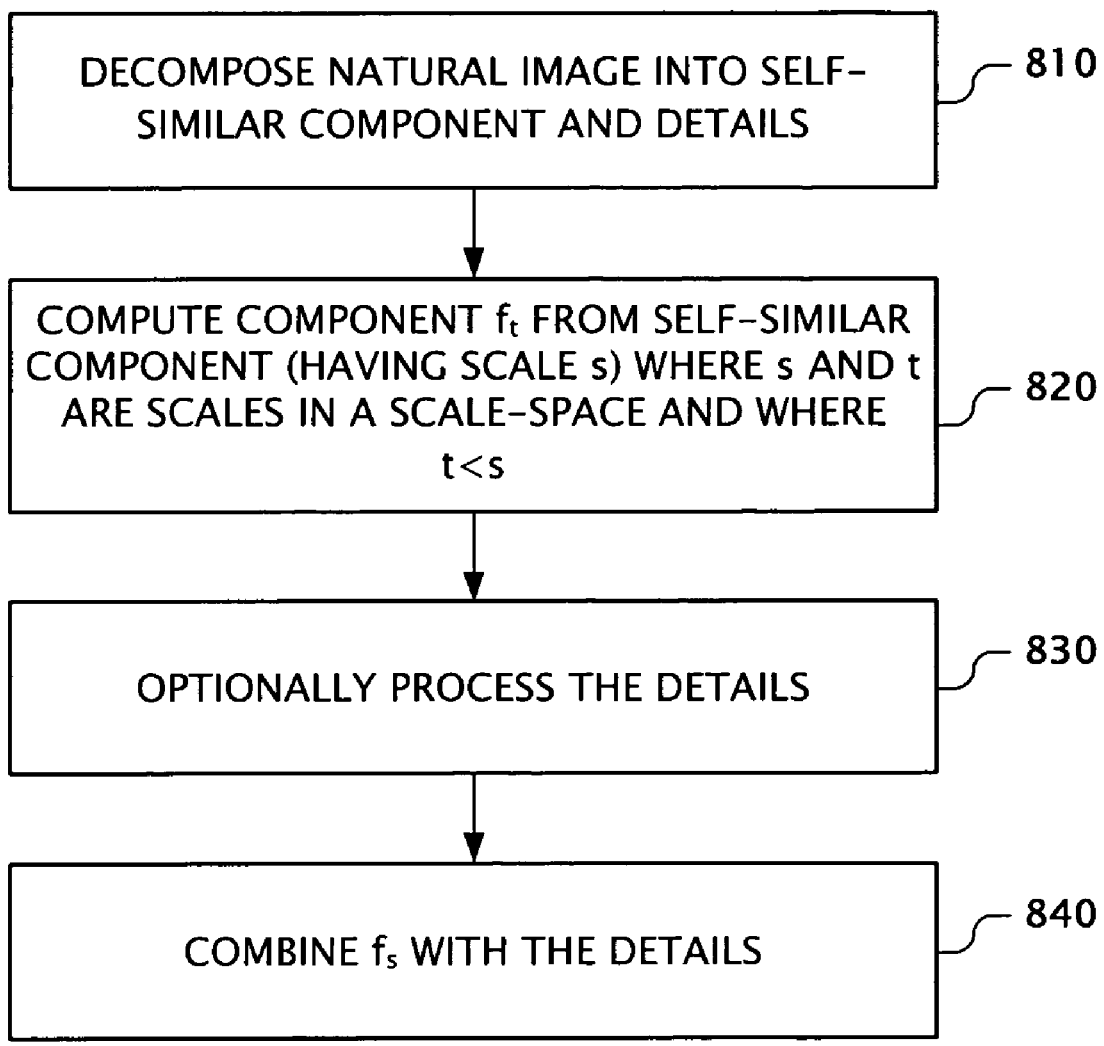
FIG. 8 is an illustration of a method of processing a natural image in accordance with an embodiment of the present invention.

Reference is made to FIG. 8. The method of processing a natural image includes decomposing the image into a self-similar component and a non-self-similar component (block 810). Let I(x) denote a natural image. The natural image may be decomposed into I(x)=$f_t$(x)+d(x), where d(x) represents the non-self-similar component (the "details"). The self-similar component $f_t$ may be approximated as $f_t$=R"(I), and the details may be approximated as d=I−$f_t$, where R is a self-similarity filter.

The self-similarity filter R may be the denoising filter R(I)[y+z]=(I*$h_{s(y)(r^2-1)}$)[y+v(y)+rz], the same that is used for denoising of representations of locally self-similar images. For example, assume that r=2, and that v(y) and s(y) are known for each position y. Each region about the position y is blurred by the kernel $h_{3s(y)}$, and the value of the output image is set at the value of the blurred image at the position y+v(y). This example corresponds to the scalar computation, where z=0. Alternate schemes may be based on disjoint and overlapping block computations, similar to the ones used for denoising representations of locally self-similar images.

The method further includes processing the self-similar component as described above (block 820); optionally processing the non-self-similar component (block 830), and combining (e.g., by simple image addition) the representation of the self-similar component at scale s(y) with the processed non-self-similar component (block 840).

The type of processing on the details will depend upon the processing objective. If the objective is deblurring, the details d(x) may be processed by a standard image sharpening algorithm. If the objective is upscaling, the details d(x) may be processed by a standard upscaling algorithm (e.g., bilinear interpolation, bicubic interpolation).

For denoising, the details could be processed by a soft-thresholding function. The following soft-thresholding function φ may be used:

$$\phi(d) = \begin{cases} d - T & d \geq T \\ d + T & d \leq -T \\ 0 & \text{otherwise} \end{cases}$$

where T is a user-defined threshold.

The method according to the present invention can be performed in a variety of imaging products. The method according to the present invention may also be performed in more powerful machines, such as computers.

Figure 9:
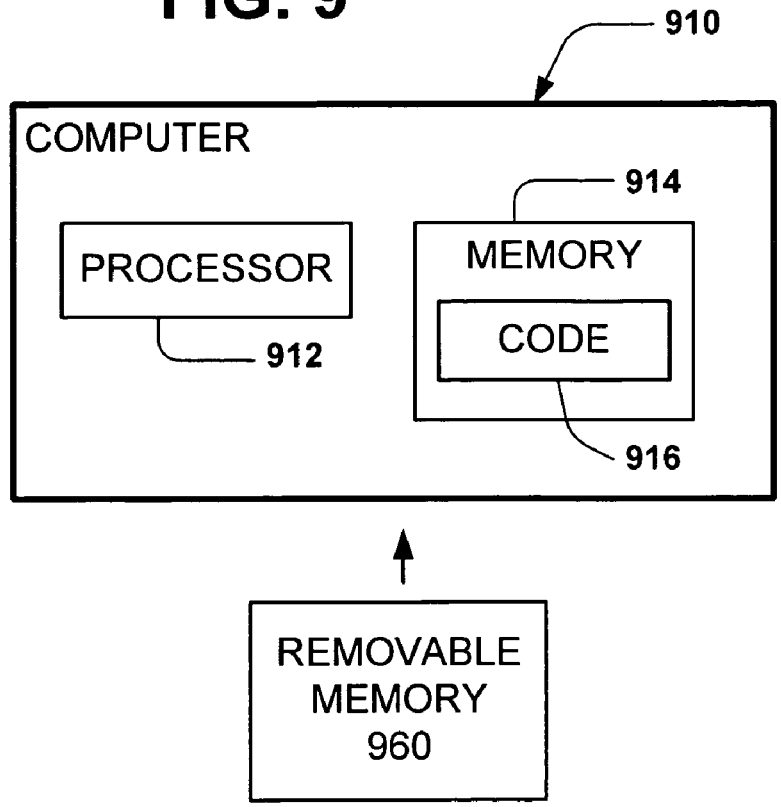
FIGS. 9 and 10 are illustrations of hardware platforms in accordance with embodiments of the present invention.
Figure 10:
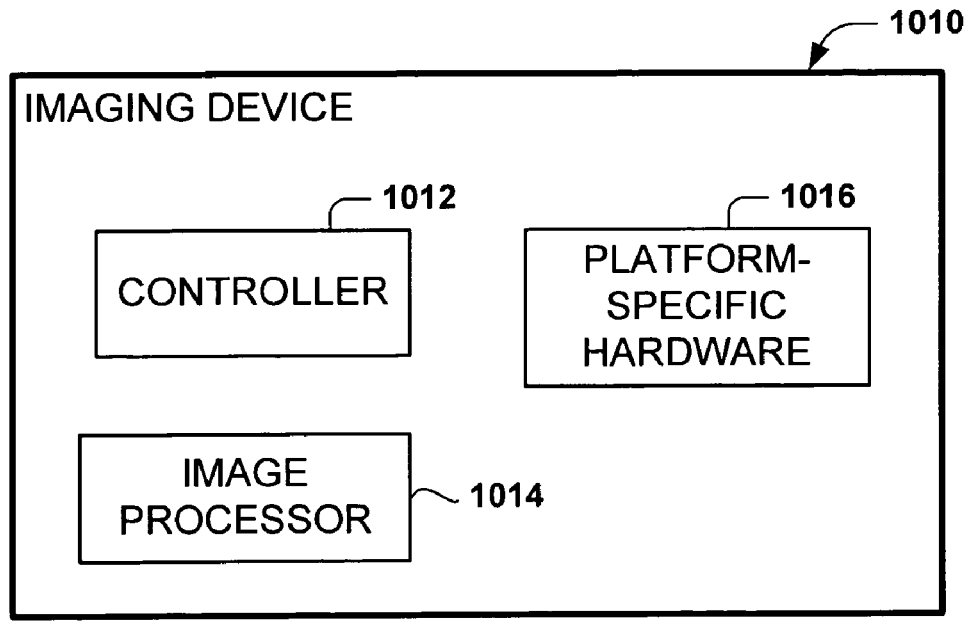

FIGS. 9 and 10 illustrate different two platforms for performing the scale-space self-similarity image processing of digital images. Referring to FIG. 9, the hardware platform may be a computer 910 including a general purpose processor 912 and memory 914 for storing code 916 that, when executed, causes the processor 912 to perform the scale-space self-similarity image processing. The code 916 can be a distributed to the computer 910, for example, as a standalone application, part of a larger program (e.g., an image editing program), a web browser plug-in, etc. The code 916 may be distributed via removable memory 960 (e.g., an optical disk), network connection, etc.

Referring to FIG. 10, the hardware platform may be an imaging device 1010. Examples of imaging devices 1010 include, without limitation, printers, scanners, digital cameras, projectors, multi-functional products, all-in-one products, copiers, digital senders, cellular phones, personal devices (e.g., PDAs), entertainment centers, and entertainment hubs.

The imaging device includes a controller 1012, image processor 1014, and device-specific hardware 1016. The image processor 1014 may be a dedicated processor (e.g., a digital signal processor, an ASIC) for performing the scale-space self-similarity image processing.

The controller 1012 and device-specific hardware 1016 depend upon the type of imaging device 1010. For example, in imaging devices 1010 such as printers and multi-function machines, the device-specific hardware 1016 would include a print engine.

As another example, if the imaging device 1010 is a digital camera, the device-specific hardware 1016 would include a photosensor array and optics. In addition to performing the image processor 1014 could also perform, demosaicing, tone mapping, etc.

Image processing in accordance with the present invention is not limited to the processing of digital images. The image processing could be performed on light (e.g., images generated by a projector or captured by an optical system). Processing such as translating and shifting could be performed by optical elements such as lenses, mirrors, diffraction devices, prisms, optical filters, light polarizers, etc.

Although several specific embodiments of the present invention have been described and illustrated, the present invention is not limited to the specific forms or arrangements of parts so described and illustrated. Instead, the present invention is construed according to the following claims.

The invention claimed is:

1. An image processing method, comprising:
computing image $f_t$ from image $f_s$, wherein the images $f_t$ and $f_s$ respectively are representations of a self-similar image $f_0$ at scales t and s in a scale-space, t<s, the image $f_t$ is upstream of the image $f_s$ in the scale-space and thereby closer in the scale-space to the self-similar image $f_0$ than the image $f_s$, and the scale-space is defined by a family of operators $\{T(k)\}$ each of which maps the self-similar image $f_0$ to a respective representation of the self-similar image $f_0$ at a scale k;
wherein the computing comprises determining one or more parameter values specifying at least one of the operators $\{T(k)\}$ based on values of the image $f_s$; and
wherein the computing is performed by a processor.

2. The method of claim 1, wherein computing image $f_t$ from image $f_s$ is performed according to $f_t(x)=(f_s*h_{tr^2-s})[r(x+\tau)]$, wherein r is a scaling factor, $\tau$ is a displacement vector, t is greater than or equal to $s/r^2$, and $h_{tr^2-s}$ is a kernel of the scale-space with an index value of $tr^2-s$.

3. The method of claim 1, wherein the images $f_t$ and $f_s$ are representations of a locally self-similar image.

4. The method of claim 1, wherein the computing comprises estimating values of self-similarity parameters for the image $f_s$, and determining the image $f_t$ by moving the image $f_s$ upstream to scale t in the scale-space based on the estimated self-similarity parameter values.

5. The method of claim 1, wherein the scale-space is an additive scale-space.

6. The method of claim 1, wherein the scale-space is Gaussian scale-space.

7. The method of claim 5, wherein computing $f_t$ from $f_s$ includes downscaling and spatially translating image $f_s$.

8. The method of claim 5, wherein computing $f_t$ from $f_s$ includes estimating cross-scale motion for each position in image $f_s$.

9. The method of claim 8, wherein estimating the cross-scale motion v(y) includes minimizing $$\varepsilon(v(y)) \triangleq \sum_{z \in W} |f_s(z+y) - f_s(y+v(y)+rz)|^2,$$

y+z represents a position in the image $f_s$, and W is a window centered at an original in a Euclidean space, and r is a scaling factor.

10. The method of claim 8, wherein a block-matching technique is used to estimate the cross-scale motion for each position.

11. The method of claim 8, further comprising estimating a scale at each position.

12. The method of claim 11, wherein estimating the scale includes minimizing $$\varepsilon(v(y), s(y)) \triangleq \sum_{z \in W} |f_s(z+y) - (f_s * h_{s(y)(r-1)})(y+v(y)+rz)|^2,$$

and $h_{s(y)(r-1)}$ is a kernel of the scale-space with an index value of s(y)(r-1).

13. The method of claim 11, wherein computing $f_t$ from $f_s$ further includes mapping an rN×rN block of $f_s*h_{tr^2-s(y)}$ centered at y+v(y) to the N×N block of $f_t$ centered at y.

14. The method of claim 13, wherein the mapping includes performing disjoint block computation.

15. The method of claim 13, wherein the mapping includes performing overlapping block computation.

16. The method of claim 13, wherein the mapping includes performing scalar computation.

17. A method of deblurring a digital image according to claim 1, wherein $f_s$ is a blurred image and $f_t$ is a deblurred image.

18. The method of claim 17, wherein computing $f_t$ from $f_s$ includes estimating cross-scale motion for each position in the input image $f_s$, and iterating n times.

19. The method of claim 18, wherein $t=s/r^{2n}$, and wherein, at each iteration, an $rN \times rN$ block of $f_s$ centered at $y+v(y)$ is mapped to an $N \times N$ block of $f_t$ centered at y.

20. A method of upscaling a digital image according to claim 1, wherein image $f_s$ is the digital image and image $S(r)f_t$ is an upscaled image, where $S(r)$ is a continuous scaling operator with a factor r.

21. The method of claim 20, wherein computing $f_t$ from $f_s$ comprises: estimating cross-scale motion for every position in image $f_s$; and computing image $S(r)f_t$ as $[S(r)f_t](ry+z)=[f_s*h_{tr^2-s}](y+v(y)+z)$, wherein $h_{tr^2-s}$ is a kernel of the scale-space with an index value of $tr^2-s$.

22. The method of claim 20, wherein an $N \times N$ block of $f_s*h_{tr^2-s(y)}$ centered at position $y+v(y)$ is mapped to an $N \times N$ block of the output, upscaled image centered at position ry.

23. The method of claim 22, wherein $t=s/r^2$, whereby an $N \times N$ block of $f_s$ centered at $y+v(y)$ is mapped to an $N \times N$ block of the output, upscaled image centered at position ry.

24. A method of digital image denoising according to claim 1, wherein $f_s+n$ is a digital image containing noise and $f_t=f_s$ is a denoised image.

25. The method of claim 24, wherein computing $f_s$ from $g=f_s+n$ includes estimating cross-scale motion $v(y)$ and the scale $s(y)$ for each position y in the input image g, and performing the operation $p(y+z)=(g*h_{s(y)(r^2-1)})[y+v(y)+rz]$ at each position, p is the output denoised image, y+z represents a position in the image $f_s$, and W is a window centered at an original in a Euclidean space, and r is a scaling factor.

26. The method of claim 24, wherein an $rN \times rN$ block of the digital image $f_s+n$ convolved by a scale-space kernel indexed $s(y)(r^2-1)$, centered at position $y+v(y)$, is mapped to an $rN \times rN$ block of the image $f_t$ centered at position y.

27. A method of processing a natural image, the method comprising decomposing the image into a self-similar component and a non-self-similar component; and performing the method of claim 1 on the self-similar component.

28. The method of claim 27, further comprising processing the non-self-similar component, and combining the representation of the self-similar component at scale t with the processed non-self-similar component.

29. A processor for performing the method of claim 1.

30. An imaging apparatus for performing the method of claim 1.

31. A computer-readable medium comprising computer-readable instructions that, when executed by a processor, cause the processor to perform operations comprising:

accessing an input digital image $f_s$; and computing an output digital image $f_t$ from the input digital image $f_s$, wherein the output and input images respectively are representations of a self-similar image $f_0$ at scales t and s in a scale-space, t<s, the image $f_t$ is upstream of the input image $f_s$ in the scale-space and thereby closer in the scale-space to self-similar image $f_0$ than the input $f_s$, and the scale-space is defined by a family of operators $\{T(k)\}$ each of which maps the self-similar image $f_0$ to a respective representation of the self-similar image $f_0$ at a scale k;

wherein the computing comprises determining one or more parameter values specifying at least one of the operators $\{T(k)\}$ based on values of the image $f_s$.

32. Apparatus, comprising:

a computer-readable medium storing computer-readable instructions; and a processor coupled to the computer-readable medium, operable to execute the instructions, and based at least in part on the execution of the instructions operable to perform operations comprising computing digital image $f_t$ from digital image $f_s$, wherein the images $f_t$ and $f_s$ respectively are representations of a self-similar image $f_0$ at scales t and s in a scale-space, t<s, the image $f_t$ is upstream of the input image $f_s$ in the scale-space and thereby closer in scale-space to self-similar image $f_0$ than the image $f_s$, and the scale-space is defined by a family of operators $\{T(k)\}$ each of which maps the self-similar image $f_0$ to a respective representation of the self-similar image $f_0$ at a scale k;

wherein the computing comprises determining one or more parameter values specifying at least one of the operators $\{T(k)\}$ based on values of the image $f_s$.

33. The apparatus of claim 32, wherein computing image $f_t$ from image $f_s$ is performed according to $f_t(x)=(f_s*h_{tr^2-s})[r(x+\tau)]$, wherein r is a scaling factor, $\tau$ is a displacement vector, t is greater than or equal to $s/r^2$, and $h_{tr^2-s}$ is a kernel of the scale-space with an index value of $tr^2-s$.

34. The apparatus of claim 32, wherein, in the computing, the computer-readable instructions cause the processor to perform operations comprising estimating values of self-similarity parameters for the image $f_s$, and determining the image $f_t$ by moving the image $f_s$ upstream to scale t in the scale-space based on the estimated self-similarity parameter values.

35. The apparatus of claim 32, wherein the scale-space is Gaussian scale-space.

36. The apparatus of claim 35, wherein computing $f_t$ from $f_s$ includes downscaling and spatially translating image $f_s$.

37. The apparatus of claim 35, wherein computing $f_t$ from $f_s$ includes estimating cross-scale motion for each position in image $f_s$.

38. The apparatus of claim 37, wherein estimating the cross-scale motion $v(y)$ and the scale $s(y)$ comprises minimizing $$\varepsilon(v(y), s(y)) \triangleq \sum_{z \in W} |f_s(z+y) - (f_s * h_{s(y)(r-1)})(y+v(y)+rz)|^2,$$

y+z represents a position in the image $f_s$, and W is a window centered at an original in a Euclidean space, and r is a scaling factor.

39. The apparatus of claim 37, wherein a block-matching technique is used to estimate the cross-scale motion for each position.

40. The apparatus of claim 32, wherein $f_s$ is a blurred digital image and $f_t$ is a deblurred image.

41. The apparatus of claim 32, wherein image $f_s$ is an input digital image and image $S(r)f_t$ is an upscaled image.

42. The apparatus of claim 32, wherein $f_s+n$ is an input digital image containing noise and $f_t=f_s$ is a denoised image.

43. The apparatus of claim 32, wherein a natural image is decomposed into a self-similar component and a non-self-similar component; and wherein the image $f_t$ is computed from the self-similar component.

44. A computer-readable medium comprising computer-readable instructions that, when executed by a processor, cause the processor to perform operations comprising:

computing digital image $f_t$ from digital image $f_s$, wherein the images $f_t$ and $f_s$ respectively are representations of a self-similar image $f_0$ at scales t and s in a scale-space, t<s, the image $f_t$ is upstream of the image $f_s$ in the scale-space and thereby closer in the scale-space to self-similar image $f_0$ than the image $f_s$, and the scale-space is defined by a family of operators $\{T(k)\}$ each of which maps the self-similar image $f_0$ to a respective representation of the self-similar image $f_0$ at a scale k;

wherein the computing comprises determining one or more parameter values specifying at least one of the operators $\{T(k)\}$ based on values of the image $f_s$.

* * * * *

UNITED STATES PATENT AND TRADEMARK OFFICE
CERTIFICATE OF CORRECTION

| | | |
|---|---|---|
| PATENT NO. | : 7,742,660 B2 | Page 1 of 1 |
| APPLICATION NO. | : 11/096651 | |
| DATED | : June 22, 2010 | |
| INVENTOR(S) | : Renato Keshet | |

It is certified that error appears in the above-identified patent and that said Letters Patent is hereby corrected as shown below:

In column 11, line 61, in Claim 31, after "input" insert -- image --.

Signed and Sealed this
Twenty-second Day of February, 2011

David J. Kappos
*Director of the United States Patent and Trademark Office*